Patented Mar. 25, 1930

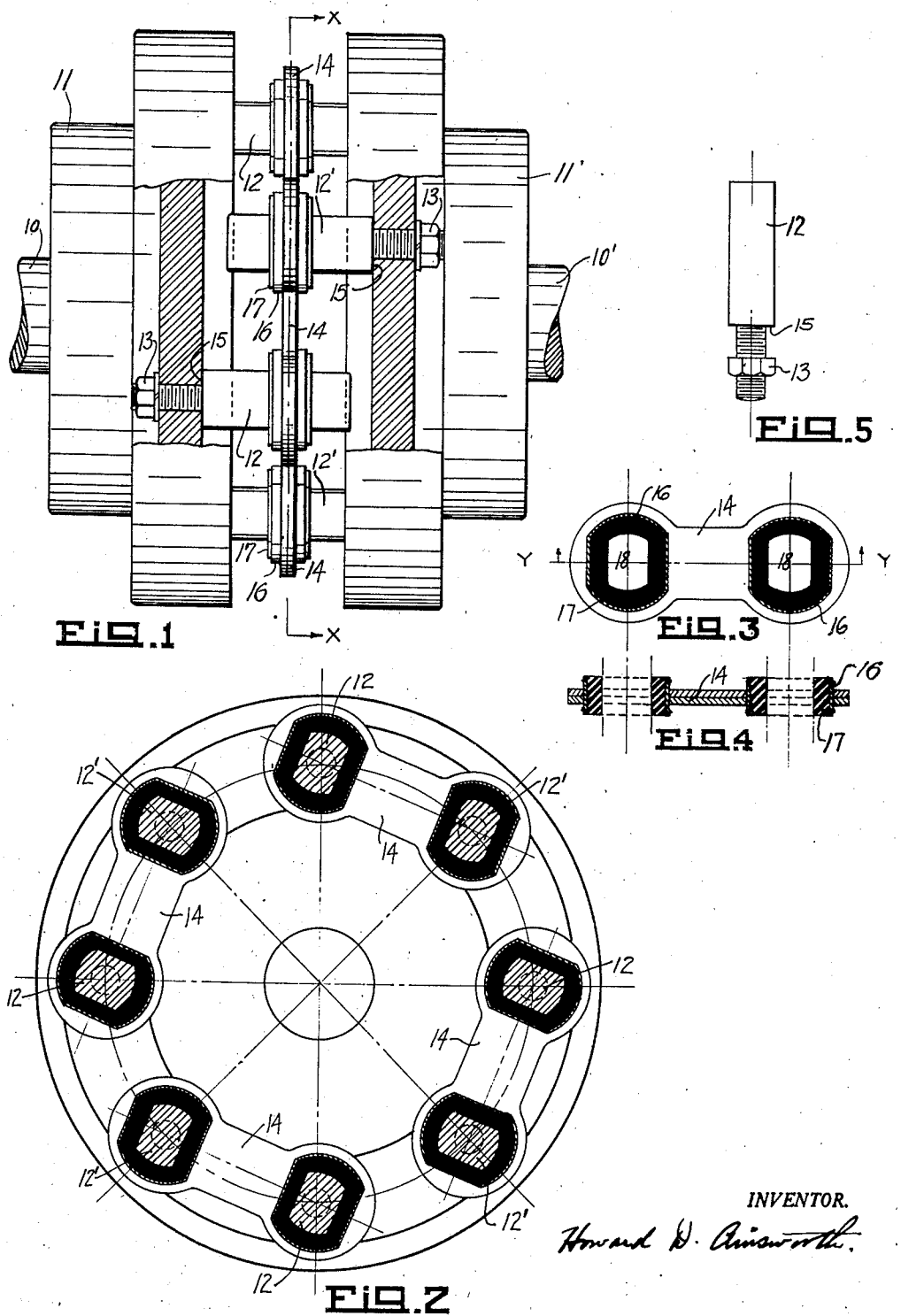

1,752,138

UNITED STATES PATENT OFFICE

HOWARD D. AINSWORTH, OF BERKELEY, CALIFORNIA, ASSIGNOR TO F. A. B. MANUFACTURING COMPANY, OF BERKELEY, CALIFORNIA

FLEXIBLE COUPLING

Application filed September 24, 1927. Serial No. 221,731.

It is the object of my invention to provide improved and more efficient means whereby two machine parts may be flexibly connected so that motion and power may be transmitted from the one to the other in other in either rotary direction.

It is a further object of my invention to secure such result by means of a novel combination of elements that insures a measure of rigidity to the assembled coupling, yet allows the two members rigidly connected with the shafting a freedom to move, within set limits, in any direction out of normal alignment; the connecting elements being provided, moreover, with a cushioning material for the absorption of shocks or jars transmitted by rotary or longitudinal movements. This cushioning material, in addition, insures a complete electrical insulation between the driving and the driven shaft.

It is a further object of my invention to provide a flexible coupling that is capable of permitting considerable longitudinal movement or end play of the machine parts that it connects.

It is a further object of my invention, of essential importance, to obviate lost motion and consequent wear and tear characteristic of ordinary flexible couplings, by achieving the object desired without the accompaniment of frictional movement between any of the individual parts comprising the assembled coupling.

I attain these objects by the mechanism illustrated in the accompanying drawing, in which—

Fig. 1 is a side elevation of the assembled coupling, with parts broken away to show the termination of the pins, and the nuts that hold the pins in position.

Fig. 2 is a cross section on line XX of Fig. 1, with the assembled coupling revolved slightly from its position shown in Fig. 1.

Fig. 3 is a detail side elevation of a single link.

Fig. 4 is a sectional detail of the link on line YY of Fig. 3.

Fig. 5 is a combined elevation and cross section of one of the pins, the cross section being taken on line XX of Fig. 1.

Referring to Figs. 1 and 2: Flanges 11 and 11', elements of this invention, are shown as secured, respectively, to a driving shaft 10 and a driven shaft 10'. From the face of each flange projects a plurality of pins 12 and 12', respectively. Links 14, through the medium of ferrules 16 and bushings 17, connect each of the pins 12 with one of the pins 12'.

By this means it is obvious that motion imparted by the shaft 10 will be transmitted through the element mentioned, to the shaft 10'.

The links 14 are preferably made of a relatively rigid material such as metal, and may be of laminated composition as shown in Figs. 3 and 4.

The bushings 17 are of resilient material, and I have found that commercial compositions of rubber are excellently adapted for this purpose.

The ferrules 16 are provided as a desirable means of securing the bushings 17 within the links 14, and, although these ferrules may be made integral with links 14 as by deflecting the laminated material of the links outwardly, I have found that it is practicable to make these ferrules of metal and to press them securely into the apertures provided in the links 14. The bushings 17 are then fixedly secured within the said ferrules, and I have found that it is practicable to accomplish this either by a vulcanizing process or by making the apertures in said ferrules irregular in shape and by providing bushings adapted to be pressed into, or expanded within, and retained by said irregularities. I have further found that it is desirable in some cases to make the bushings 17 project beyond the ends of the ferrules 16, as is clearly shown in the drawing, thereby providing protecting cushions on both sides of each link. This construction is of especial advantage when more than one link is used on each of the pins 12 and 12'. As also illustrated in Fig. 5 the pins 12 and 12' are preferably provided with cylindrical portions adapted to fit in holes provided for their reception in the flanges 11 and 11', respectively. Nuts 13 draw the pins into position against the shoulders 15, thus insuring rigidity.

One of the important purposes of this invention is to provide means of preventing movement, while the coupling is in operation, between the surfaces of the pins 12 and 12', and the surfaces of the bushings 17 in contact therewith; and I have found it practicable to accomplish this by making the pins 12 and 12' irregular as to surface contours and by providing apertures in the bushings 17 adapted to snugly fit or encompass said surface irregularities. The drawings disclose one simple and practical exemplification of such means, comprising the provision of alternately flattened and rounded surfaces on the pins 12 and 12', and of apertures in the bushings 17 which conform therewith and are adapted to fit snugly thereon.

This completes a description of elements essential to the invention, but I desire to emphasize the fact that deviation may be made from the forms of construction specifically described without departing from the essence of novelty involved, and I ask that I be not limited to the particular embodiment disclosed.

Following is a description of the functioning of the various elements of the invention when it is in operation:

It will be seen that motion transmitted by the coupling will result in compressing or deforming the bushings 17, and that irregularities of motion due either to fluctuation in the annular velocity of the driving shaft; or to variation of loads imposed upon, or by, the driven shaft; or to deviations from true alignment of the shafts; or to longitudinal movement of either shaft will tend to be compensated for by variations in the degree to which different bushings will be compressed or deformed. Thus the desired object of providing flexibility is accomplished.

Now observe that when the coupling is operated between two shafts that are misaligned in such manner that their axes are parallel but out of center; or in such manner that their axes intersect but diverge at an angle; or when relative longitudinal movement takes place between the shafts, the bushings 17 will have a tendency to oscillate or rock on the pins which carry them. And observe that, inasmuch as special means have been provided to prevent movement between any of the contacting surfaces of the said pins, bushings, ferrules or links, therefore the said relative oscillation, or lateral rocking of the links and bushings with respect to the pins is permitted only as a result of distortion of the resilient bushings 17.

In ordinary link-type flexible couplings oscillation and lateral rocking or sliding of the links is accompanied by surface movements between links and pins, and these movements are deliberately intended and provided for as means of permitting any or all of the several forms of shaft misalignments or the relative movements between the shafts.

In the present invention, however, it is an express purpose that deformation of the bushings 17 should take place when required in lieu of any movement between the load-carrying surfaces. The reason for this is that, as is well known, rubber employed as a resilient medium, subjected to repeated compression and extension, is extremely durable; whereas the same or any similar material used as a bearing or journal surface wears or disintegrates rapidly unless efficiently lubricated.

My invention provides for the full utilization of the favorable characteristics of rubber as a medium to permit power transmission between shafts that may be out of alignment, and it achieves this object without wear or appreciable deterioration of the rubber and without the need for lubrication. The movement of the resilient material used is a movement that is confined to a rearrangement of internal particles, without surface slip or frictional wear, thereby insuring a prolonged life for the rubber and adequate flexibility.

The torque transmitted by the flexible coupling imposes either a tensile or a compressive stress upon each of the links 14, depending upon the direction of rotation of the coupling. This stress is exerted in the direction of the centerline of the link and is transmitted to the link through the pins 12 and 12' and bushings 17. It will be noted that each of the pins 12 and 12' is positioned within its respective bushing so that the flattened surfaces of the pin and bushing are at right angles to the centerline of the link through which these members extend. This construction provides a uniform thickness of bushing material between each of the flattened surfaces of the pin and the opposed flat wall of the ferrule surrounding the pin. The uniform thickness of bushing material so formed has a cross sectional area that is large compared to the cross sectional area of the link, so that with a large stress in the link there is but a nominal stress in the bushing. Also the uniform thickness of the bushing in the region of stress causes uniform deflections of all portions of the bushing in this region. The relatively low stresses and uniform deflections to which the bushings of this invention are subjected, enables these bushings to have an exceedingly long life in actual use.

The foregoing description indicates but one possible application of my invention: for the purpose of coupling together two shafts. The various features of novelty disclosed in the foregoing specifications, however, may be embodied in many other alternative forms and utilized for other and distinct purposes; and I claim protection for all variations within the scope of the invention.

I claim, therefore:

1. A flexible coupling comprising a driving flange, a driven flange, removable pins carried by each of said flanges and extending toward the other of said flanges, said pins having alternatively flattened and rounded surface portions, a plurality of links for transmitting the driving force from the driving to the driven flange, each of said links having one end connected to a pin carried by the driving flange and its other end connected to a pin carried by the driven flange, resilient bushings interposed between said pins and said links, said bushings conforming to the alternately flattened and rounded surface portions of said pins and adapted to be uniformly distorted by the action of the driving force.

2. A flexible coupling comprising a driving flange, a driven flange, removable pins carried by each of said flanges and extending toward the other of said flanges, said pins having alternatively flattened and rounded surface portions, a plurality of links for transmitting the driving force from the driving to the driven flange, said links being provided with apertures in their ends, ferrules secured within the apertures in said links, said ferrules having alternatively flattened and rounded inner surface portions, resilient bushings positioned within said ferrules, the outer surfaces of said bushings conforming to the inner surfaces of said ferrules, said bushings having alternately flattened and rounded inner surface portions that conform to and fit upon the surface portions of said pins, the flattened surface portions of each of said ferrules, bushings and pins extending at right angles to the centerline of their respective links.

3. A flexible coupling comprising, a driving flange, a driven flange, a plurality of links positioned between said flanges and arranged circumferentially with respect to the axes of said flanges, ferrules carried by said links and having alternately flattened and rounded inner surface portions, removable pins carried by said flanges and arranged circumferentially with respect to the axes of said flanges, said pins extending through said ferrules and having alternately flattened and rounded surface portions, resilient bushings interposed between said pins and said ferrules, said bushings having their inner surfaces adhering to said pins and their outer surfaces adhering to said ferrules, the flattened surfaces of said ferrules and pins being parallel and extending at right angles to the centerline of the links so that the driving force transmitted by the links causes uniform stresses and distortions in said bushings.

4. In a flexible coupling, as described, comprising end flanges, motion transmitting pins carried by said flanges, said pins having cross sections of irregular contour, a series of connecting links of relatively rigid material with apertures in which are snugly fitted a corresponding number of metallic ferrules surrounding a corresponding number of bushings of relatively resilient material, the thickness of such bushings being greater than the thickness of either the links or the ferrules, so that a projection of cushioning and electrically insulating material is provided on each side of each link; the bushings of resilient material containing, moreover, apertures other than circular and thereby providing a snug fit for the pins used to transmit the motion, in conformity with the cross section of said pins.

5. A flexible coupling for transmitting motion, comprising a driving flange and a driven flange; removable pins, of a cross section other than circular, projecting from the faces of both flanges; links of relatively rigid material containing apertures other than circular; metallic ferrules designed to fit into said apertures; bushings, of relatively resilient material, designed to fit into and to be attached to said metallic ferrules and containing apertures also other than circular and in conformity with the cross-sectional shape of the pins; and means to secure the adhesion of bushing to pin and of bushing to ferrule.

HOWARD D. AINSWORTH.